United States Patent
Ackley et al.

(10) Patent No.: US 8,002,173 B2
(45) Date of Patent: Aug. 23, 2011

(54) AUTOMATIC DATA COLLECTION DEVICE, METHOD AND ARTICLE

(75) Inventors: Sprague Ackley, Everett, WA (US); Jeffrey M. Hunt, Woodinville, WA (US)

(73) Assignee: Intermec IP Corp., Everett, WA (US)

( * ) Notice: Subject to any disclaimer, the term of this patent is extended or adjusted under 35 U.S.C. 154(b) by 1033 days.

(21) Appl. No.: 11/775,088

(22) Filed: Jul. 9, 2007

(65) Prior Publication Data

US 2008/0011822 A1    Jan. 17, 2008

Related U.S. Application Data

(60) Provisional application No. 60/830,020, filed on Jul. 11, 2006, provisional application No. 60/834,314, filed on Jul. 28, 2006.

(51) Int. Cl.
*G06F 17/00* (2006.01)
(52) U.S. Cl. ........................................ 235/375; 235/454
(58) Field of Classification Search .................. 235/375, 235/385, 435, 440, 449, 454, 462.01, 462.13; 380/255, 270, 282
See application file for complete search history.

(56) References Cited

U.S. PATENT DOCUMENTS

| | | | |
|---|---|---|---|
| 836,531 A | 11/1906 | Pickard | |
| 837,616 A | 12/1906 | Dunwoody | |
| 3,710,337 A | 1/1973 | Grant | 343/701 |
| 3,852,755 A | 12/1974 | Works et al. | 343/701 |
| 3,949,403 A | 4/1976 | Yoshida et al. | 343/225 |
| 4,056,710 A | 11/1977 | Shepardson et al. | 235/437 |
| 4,079,482 A | 3/1978 | Yeh | 197/1 A |
| 4,080,603 A | 3/1978 | Moody | 343/712 |
| 4,307,293 A | 12/1981 | Lazzarotti et al. | 235/462 |
| 4,344,184 A | 8/1982 | Edwards | 455/95 |
| 4,354,101 A | 10/1982 | Hester et al. | 235/463 |
| 4,385,231 A | 5/1983 | Mizutani et al. | 235/382 |
| 4,443,794 A | 4/1984 | Sakurai | 340/748 |
| 4,523,087 A | 6/1985 | Benton | 235/379 |
| 4,562,102 A | 12/1985 | Rabuse et al. | 428/43 |
| 4,567,361 A | 1/1986 | Rosenthal | 235/462 |
| 4,575,621 A | 3/1986 | Dreifus | 235/380 |
| 4,589,144 A | 5/1986 | Namba | 382/61 |
| 4,728,784 A | 3/1988 | Stewart | 235/462 |
| 4,742,567 A | 5/1988 | Ohe et al. | 455/277 |
| 4,782,221 A | 11/1988 | Brass et al. | 235/494 |
| 4,785,451 A | 11/1988 | Sako et al. | 371/37 |
| 4,786,792 A | 11/1988 | Pierce et al. | 235/456 |

(Continued)

FOREIGN PATENT DOCUMENTS

DE    33 30 261    3/1985

(Continued)

OTHER PUBLICATIONS

"Alien Squiggle Family of EPC RFID Tags," Alien Technology Corporation, 2005, pp. 1-2.

(Continued)

*Primary Examiner* — Thien M Le
(74) *Attorney, Agent, or Firm* — Seed IP Law Group PLLC

(57) ABSTRACT

A first machine-readable data carrier comprises an embedded command to control communication with a second machine-readable data carrier. An automatic data collection system is configured to extract the embedded command from the first machine-readable data carrier and to execute the command with respect to the second machine-readable data carrier.

46 Claims, 8 Drawing Sheets

U.S. PATENT DOCUMENTS

| | | | |
|---|---|---|---|
| 4,792,910 A | 12/1988 | Lange | 364/519 |
| 4,794,239 A | 12/1988 | Allais | 235/462 |
| 4,810,867 A | 3/1989 | Speicher | 235/494 |
| 4,816,839 A | 3/1989 | Landt | 343/795 |
| 4,823,311 A | 4/1989 | Hunter et al. | 364/900 |
| 4,827,395 A | 5/1989 | Anders et al. | 364/138 |
| 4,841,128 A | 6/1989 | Göttrup et al. | 235/491 |
| 4,853,705 A | 8/1989 | Landt | 343/803 |
| 4,855,581 A | 8/1989 | Mertel et al. | 235/462 |
| 4,915,519 A | 4/1990 | Afzali-Ardakani et al. | 400/120 |
| 4,916,296 A | 4/1990 | Streck | 235/454 |
| 4,980,544 A | 12/1990 | Winter | 235/436 |
| 5,047,860 A | 9/1991 | Rogalski | 358/198 |
| 5,075,691 A | 12/1991 | Garay et al. | 343/830 |
| 5,095,382 A | 3/1992 | Abe | 359/489 |
| 5,097,263 A | 3/1992 | Delpech et al. | 341/155 |
| 5,097,484 A | 3/1992 | Akaiwa | 375/40 |
| 5,101,200 A * | 3/1992 | Swett | 340/937 |
| 5,128,526 A | 7/1992 | Yoshida | 235/456 |
| 5,142,292 A | 8/1992 | Chang | 343/742 |
| 5,160,023 A | 11/1992 | Adams et al. | 206/256 |
| 5,184,005 A | 2/1993 | Ukai et al. | 235/472 |
| 5,204,515 A | 4/1993 | Yoshida | 235/456 |
| 5,216,233 A | 6/1993 | Main et al. | 235/472 |
| 5,216,419 A | 6/1993 | Fujisaka et al. | 340/825.54 |
| 5,218,689 A | 6/1993 | Hotle | 395/425 |
| 5,220,335 A | 6/1993 | Huang | 343/700 |
| 5,243,655 A | 9/1993 | Wang | 380/51 |
| 5,267,800 A | 12/1993 | Petteruti et al. | 400/88 |
| 5,278,395 A | 1/1994 | Benezet | 235/384 |
| 5,280,159 A | 1/1994 | Schultz et al. | 231/382 |
| 5,298,731 A | 3/1994 | Ett | 235/494 |
| 5,300,761 A | 4/1994 | Kasahara et al. | 235/375 |
| 5,315,511 A * | 5/1994 | Matsuura et al. | 705/43 |
| 5,324,922 A | 6/1994 | Roberts | 235/375 |
| 5,324,927 A | 6/1994 | Williams | 235/494 |
| 5,341,381 A | 8/1994 | Fuller | 371/10.1 |
| 5,380,998 A | 1/1995 | Bossen et al. | 235/494 |
| 5,382,778 A | 1/1995 | Takahira et al. | 235/380 |
| 5,382,784 A | 1/1995 | Eberhardt | 235/472 |
| 5,387,783 A | 2/1995 | Mihm et al. | 235/375 |
| 5,389,770 A | 2/1995 | Ackley | 235/462 |
| 5,420,403 A | 5/1995 | Allum et al. | 235/375 |
| 5,430,441 A | 7/1995 | Bickley et al. | 340/825.54 |
| 5,434,401 A | 7/1995 | Bauser | 235/454 |
| 5,434,572 A | 7/1995 | Smith | 342/44 |
| 5,448,110 A | 9/1995 | Tuttle et al. | 257/723 |
| 5,463,643 A | 10/1995 | Gaskins et al. | 371/40.1 |
| 5,466,501 A | 11/1995 | Logan et al. | 428/40 |
| 5,479,515 A | 12/1995 | Longacre, Jr. | 380/54 |
| 5,484,997 A | 1/1996 | Haynes | 235/492 |
| 5,489,908 A | 2/1996 | Orthmann et al. | 342/42 |
| 5,497,701 A | 3/1996 | Uland | 101/288 |
| 5,499,397 A | 3/1996 | Wadin et al. | 455/277.1 |
| 5,514,858 A | 5/1996 | Ackley | 235/462 |
| 5,521,601 A | 5/1996 | Kandlur et al. | 342/44 |
| 5,521,815 A | 5/1996 | Rose, Jr. | 364/409 |
| 5,528,222 A | 6/1996 | Moskowitz et al. | 340/572 |
| 5,536,924 A | 7/1996 | Ackley | 235/454 |
| 5,539,191 A | 7/1996 | Ackley | 235/462 |
| 5,548,110 A | 8/1996 | Storch et al. | 235/472 |
| 5,550,365 A | 8/1996 | Klancnik et al. | 235/462 |
| 5,550,547 A | 8/1996 | Chan et al. | 342/42 |
| 5,552,591 A | 9/1996 | Bossen et al. | 235/462 |
| 5,553,041 A | 9/1996 | Inagawa et al. | 369/48 |
| 5,553,084 A | 9/1996 | Ackley et al. | 371/37.1 |
| 5,554,974 A | 9/1996 | Brady et al. | 340/572 |
| 5,557,092 A | 9/1996 | Ackley et al. | 235/462 |
| 5,560,293 A | 10/1996 | Boreali et al. | 101/288 |
| 5,563,402 A | 10/1996 | Reddersen et al. | 235/436 |
| 5,565,847 A | 10/1996 | Gambino et al. | 340/572 |
| 5,566,441 A | 10/1996 | Marsh et al. | 29/600 |
| 5,588,005 A | 12/1996 | Ali et al. | 370/346 |
| 5,594,228 A | 1/1997 | Swartz et al. | 235/383 |
| 5,612,531 A | 3/1997 | Barkan | 235/462 |
| 5,619,027 A | 4/1997 | Ackley | 235/462 |
| 5,629,508 A | 5/1997 | Findley, Jr. et al. | 235/38 R |
| 5,640,002 A | 6/1997 | Ruppert et al. | 235/472 |
| 5,659,431 A | 8/1997 | Ackley | 359/798 |
| 5,673,037 A | 9/1997 | Cesar et al. | 340/825.54 |
| 5,712,643 A | 1/1998 | Skladany | 343/700 |
| 5,723,853 A | 3/1998 | Longacre, Jr. et al. | 235/472 |
| 5,729,201 A | 3/1998 | Jahnes et al. | 340/572 |
| 5,761,219 A | 6/1998 | Maltsev | 371/37.01 |
| 5,761,529 A | 6/1998 | Raji et al. | 395/824 |
| 5,763,867 A | 6/1998 | Main et al. | 235/472 |
| 5,767,498 A | 6/1998 | Heske, III et al. | 235/463 |
| 5,777,310 A | 7/1998 | Liu et al. | 235/462 |
| 5,777,561 A | 7/1998 | Chieu et al. | 340/825.54 |
| 5,782,496 A | 7/1998 | Casper et al. | 283/81 |
| 5,786,626 A | 7/1998 | Brady et al. | 257/673 |
| 5,788,796 A | 8/1998 | Look et al. | 156/277 |
| 5,805,082 A | 9/1998 | Hassett | 340/928 |
| 5,811,781 A | 9/1998 | Ackley | 235/462 |
| 5,812,065 A | 9/1998 | Schrott et al. | 340/825.54 |
| 5,818,031 A | 10/1998 | Endoh | 235/494 |
| 5,840,657 A | 11/1998 | Mehta et al. | 503/204 |
| 5,842,118 A | 11/1998 | Wood, Jr. | 455/101 |
| 5,874,896 A | 2/1999 | Lowe et al. | 340/572 |
| 5,874,902 A | 2/1999 | Heinrich et al. | 340/825.54 |
| 5,923,305 A | 7/1999 | Sadler et al. | 343/895 |
| 5,942,987 A | 8/1999 | Heinrich et al. | 340/825.54 |
| 5,972,156 A | 10/1999 | Brady et al. | 156/280 |
| 5,973,598 A | 10/1999 | Beigel | 340/572.1 |
| 5,973,600 A | 10/1999 | Mosher, Jr. | 340/572.8 |
| 5,979,773 A | 11/1999 | Findley, Jr. et al. | 235/492 |
| 5,982,904 A | 11/1999 | Eghtesadi et al. | 381/74 |
| 5,993,093 A | 11/1999 | Schoennauer et al. | 400/621 |
| 6,003,775 A | 12/1999 | Ackley | 235/472.01 |
| 6,012,638 A | 1/2000 | Ackley et al. | 235/462.01 |
| 6,019,865 A | 2/2000 | Palmer et al. | 156/265 |
| 6,024,289 A | 2/2000 | Ackley | 235/494 |
| 6,025,784 A | 2/2000 | Mish | 340/693.5 |
| 6,076,064 A | 6/2000 | Rose, Jr. | 705/1 |
| 6,078,259 A | 6/2000 | Brady et al. | 340/572.7 |
| 6,081,718 A * | 6/2000 | Ando et al. | 455/447 |
| 6,092,133 A | 7/2000 | Erola et al. | 710/102 |
| 6,097,301 A | 8/2000 | Tuttle | 340/693.9 |
| 6,104,311 A | 8/2000 | Lastinger | 340/825.54 |
| 6,118,379 A | 9/2000 | Kodukula et al. | 340/572.8 |
| 6,123,796 A | 9/2000 | Kathmann et al. | 156/249 |
| 6,149,059 A | 11/2000 | Ackley | 235/462 |
| 6,180,198 B1 | 1/2001 | Bond | 428/43 |
| 6,210,515 B1 | 4/2001 | Boreali et al. | 156/250 |
| 6,243,013 B1 | 6/2001 | Duan et al. | |
| 6,246,326 B1 | 6/2001 | Wiklof et al. | 340/572.1 |
| 6,259,372 B1 | 7/2001 | Taranowski et al. | 340/683 |
| 6,272,242 B1 | 8/2001 | Saitoh et al. | 382/187 |
| 6,278,413 B1 | 8/2001 | Hugh et al. | 343/818 |
| 6,285,342 B1 | 9/2001 | Brady et al. | 343/895 |
| 6,286,763 B1 | 9/2001 | Reynolds et al. | 235/472.01 |
| 6,321,986 B1 * | 11/2001 | Ackley | 235/462.01 |
| 6,327,972 B2 | 12/2001 | Heredia et al. | 101/35 |
| 6,360,208 B1 | 3/2002 | Ohanian et al. | 705/31 |
| 6,371,375 B1 | 4/2002 | Ackley et al. | 235/462.45 |
| 6,409,401 B1 | 6/2002 | Petteruti et al. | 400/88 |
| 6,422,476 B1 | 7/2002 | Ackley | 235/494 |
| 6,512,482 B1 | 1/2003 | Nelson et al. | 343/700 MS |
| 6,570,386 B2 | 5/2003 | Goldstein | 324/415 |
| 6,585,159 B1 | 7/2003 | Meier et al. | 235/462.31 |
| 6,585,437 B1 | 7/2003 | Wiklof et al. | 400/621 |
| 6,593,853 B1 | 7/2003 | Barrett et al. | 340/572.1 |
| 6,664,897 B2 | 12/2003 | Pape et al. | 340/573.3 |
| 6,677,852 B1 * | 1/2004 | Landt | 235/380 |
| 6,707,376 B1 | 3/2004 | Patterson et al. | 340/10.3 |
| 6,899,476 B1 | 5/2005 | Barrus et al. | 400/76 |
| 6,933,848 B1 | 8/2005 | Stewart et al. | 340/572.3 |
| 6,967,577 B2 * | 11/2005 | Taylor et al. | 340/572.1 |
| 7,323,977 B2 | 1/2008 | Kodukula et al. | 340/505 |
| 7,423,539 B2 | 9/2008 | Hyde et al. | 340/573.4 |
| 7,528,728 B2 | 5/2009 | Oliver et al. | 340/572.8 |
| 7,546,955 B2 | 6/2009 | Marty et al. | 235/470 |
| 7,579,955 B2 | 8/2009 | Pillai | |
| 7,667,589 B2 | 2/2010 | Desmons et al. | 340/522 |
| 2003/0218069 A1 | 11/2003 | Meier et al. | 235/462.25 |
| 2005/0120260 A1 * | 6/2005 | Suzuki et al. | 714/5 |
| 2005/0212674 A1 | 9/2005 | Desmons et al. | 340/572.7 |

| | | | | |
|---|---|---|---|---|
| 2006/0022801 | A1 | 2/2006 | Husak et al. | 340/10.5 |
| 2006/0028343 | A1* | 2/2006 | Taylor et al. | 340/572.1 |
| 2006/0267731 | A1 | 11/2006 | Chen | 340/10.1 |
| 2007/0024423 | A1 | 2/2007 | Nikitin et al. | 340/10.1 |
| 2007/0081671 | A1* | 4/2007 | Ross et al. | 380/255 |
| 2007/0194929 | A1 | 8/2007 | Wagner et al. | |
| 2007/0296582 | A1* | 12/2007 | Rofougaran | 340/572.1 |
| 2007/0296583 | A1* | 12/2007 | Rofougaran | 340/572.1 |
| 2008/0188209 | A1* | 8/2008 | Dorogusker et al. | 455/414.2 |
| 2008/0231451 | A1* | 9/2008 | Kamel | 340/572.1 |
| 2009/0272812 | A1 | 11/2009 | Marty et al. | 235/470 |

FOREIGN PATENT DOCUMENTS

| | | |
|---|---|---|
| EP | 0 595 549 A2 | 5/1994 |
| EP | 0 667 592 A1 | 8/1995 |
| EP | 0 718 912 A1 | 6/1996 |
| FR | 2 760 209 | 9/1998 |
| JP | 3113673 A | 5/1991 |
| JP | 1040329 A | 2/1998 |
| JP | 11-221948 | 8/1999 |
| WO | WO 95/12863 | 5/1995 |
| WO | WO 96/13803 | 5/1996 |
| WO | WO 98/47101 | 10/1998 |
| WO | WO 2007/035863 | 3/2007 |

OTHER PUBLICATIONS

Atmel Microcontroller with Transponder Interface manual, U9280M-H, 2005.
"AXCESS: Radio Frequency Identification Overview," http://www.axcessinc.com/prod_rfidoverview.php, download date Sep. 13, 2006, pp. 1-3.
K.V. Rao et al., "Antenna Design for UHF RFID Tags: A Review and a Practical Application," *IEEE Transactions on Antennas and Propagation*, vol. 53, No. 12, Dec. 2005, pp. 3870-3876.
Kirman et al., "Stochastic Communication and Coalition Formation," Econometrica, vol. 54, No. 1, Jan. 1986, pp. 129-138.
"Radio-Frequency Identification of Animals—Code Structure," ISO 11784, Second Edition, Aug. 15, 1996.
"Radio-Frequency Identification of Animals—Code Structure—Amendment 1," ISO 11784, Second Edition, Aug. 15, 1996, Amendment 1, Nov. 15, 2004.
"Radio-Frequency Identification of Animals—Technical Concept," ISO 11785, First Edition, Oct. 15, 1996.
"RFID Tags by RFIDSupplyChain.com," URL: http://www.rfidsupplychain.com/Categories.bok?category=RFID+Tags, 2006, download date Jun. 22, 2006, pp. 1-3.
U.S. Appl. No. 11/397,923, filed Apr. 3, 2006, Zimmerman et al.
U.S. Appl. No. 11/464,038, filed Aug. 11, 2006, Pillai.
U.S. Appl. No. 60/719,102, filed Sep. 21, 2005, Maltseff et al.
U.S. Appl. No. 60/830,020, filed Jul. 11, 2006, Ackley et al.
U.S. Appl. No. 60/834,314, filed Jul. 28, 2006, Ackley et al.
"Smart Dust: Autonomous sensing and communication in a cubic millimeter," http://robotics.eecs.berkeley.edu/~pister/SmartDust/, download date Sep. 13, 2006, pp. 1-6.
Straw, R., et al., *The ARRL Handbook—For Radio Amateurs*, 76th ed., The American Radio Relay League, Newington, CT, 1999, Chapter 20, "Antennas & Projects," pp. 20.31-20.37.
Technical Specification: Aircraft-Integrated Data Processing Materials Management-Bar Coding, ISO/TS 21849, First Edition, Jul. 1, 2003.
"Information Technology—Radio Frequency Identification for Item Management: Part 6: Parameters for Air Interface Communications at 860 MHz to 960MHz," ISO/IEC 18000-6, First Edition, Aug. 15, 2004.
"International Technical Standard: Extended Channel Interpretations: Part 1: Identification Schemes and Protocol," AIM Publication ITS/04-001 (May 24, 2004).
"International Symbology Specification—93i," AIM Publication ITS/99-004, Nov. 5, 1999.
"Information Technology—Automatic Identification and Data Capture Techniques—Bar Code Symbology Specifications," International Standard ISO/IEC 15438, First Edition, Sep. 15, 2001.
"Information Technology: Transfer Syntax for High Capacity ADC Media," International Standard ISO/IEC 15434, First Edition, Oct. 1, 1999.
Maltseff et al., Synchronization of Adaptive Self-Configuring Wireless Network of Transponders U.S. Appl. No. 60/610,759, filed Dec. 1, 2004, 5 pages.
U.S. Appl. No. 09/328,028, filed Jun. 8, 1999, Wiklof et al.
U.S. Appl. No. 09/375,815, filed Aug. 17, 1999, Ackley.
U.S. Appl. No. 09/375,913, filed Aug. 17, 1999, Ackley.
AIM USA, "Uniform Symbology Specification Code 93," Apr. 1993, pp. 1-10.
AIM USA, "Uniform Symbology Specification Code One," Jul. 1994, pp. 1-32.
AIM USA, "Uniform Symbology Specification PDF417," Jul. 1994, pp. 1-34. International Product Code (IPC)-2D Symbology Specification, Version: Sep. 7, 1997, pp. 1-7.
AIM USA, "Uniform Symbology Specification Code 16K," American National Standards Institute, Inc., Approved Aug. 16, 1995, pp. 1-17.
AIM USA, "Uniform Symbology Specification Code 49," American National Standards Institute, Inc., Approved Aug. 16, 1995, pp. 1-26.
AIM USA, "Uniform Symbology Specification Code 128," American National Standards Institute, Inc., Approved Aug. 16, 1995, pp. 1-12.
AIM USA, "Uniform Symbology Specification Code 39", American National Standards Institute, Inc. Approved Aug. 16, 1995, pp. 1-11.
AIM USA, "Uniform Symbology Specification Interleaved 2-of-5", American National Standards Institute, Inc. Approved Aug. 16, 1995, pp. 1-11.
AIM USA, "Uniform Symbology Specification Codabar", American National Standards Institute, Inc. Approved Aug. 16, 1995, pp. 1-11.
AIM USA, "Uniform Symbology Specification Code 93", American National Standards Institute, Inc. Approved Aug. 16, 1995, pp. 1-10.
AIM International, Inc., "International Technical Specification—Symbology Identifiers", Jun. 18, 1998, Document Version 1.0, pp. 1-17.
AIM USA, "Understanding 2d Symbologies, A Detailed Overview and Technical Introduction," Copyright 1999, pp. 1-49.
Alphanumeric Data Compaction, Rev. C., Intermec Corporation, Everett, Washington, 1992, 6 pages.
Arthur, NN81102407 IBM Technical Disclosure Bulletin, Oct. 1981, vol. 24, Issue 5, p. 2407.
"Bar Code Compression Decompression," IBM Technical Disclosure Bulletin 32:12, May 1990, pp. 288-290.
Bar Code Print Quality—Guideline, ANSI X3.182-1990, pp. 1-29.
Businessworld, Cigarette firms complain barcode requirement is 'too costly', Nov. 1998.
Codablock F (128), Bar Coding—Symbology Specification—Codablock, ICS International AG, 1993, pp. 1-44.
Dallas Semiconductor Corporation, Book of DS199x Touch Memory Standards, 1992.
Dallas Semiconductor Corporation, Dallas Takes the Memory Out of the Computer, Feb. 1993.
Extended Channel Interpretation (ECI) Assignments, Release 2, ECI Assignments, Aug. 1995, pp. 1-13.
Information processing—8-bit single-byte coded graphic character sets—, Part 1: Latin alphabet No. 1, ISO 8859-1:1987 (E), pp. 1-7.
Information processing—8-bit single-byte coded graphic character sets, Part 4: Latin alphabet No. 4, ISO 8859-4:1988 (E), pp. 1-5.
IPC-2D Symbology Specification, Sep. 7, 1997, pp. 1-7.
International Product Code (IPC)-13 Symbology Specification (preliminary), Version: Sep. 4, 1997, 99.1-10.
International Product Code (IPC)-14 Symbology Specification (preliminary), Version: Sep. 1, 1997, pp. 1-9.
Material Handling Engineering, Going with the Flow: The 1998 Roundtable Report, Dec. 1998.
NN86055595 IBM Technical Disclosure Bulletin, May 1986, vol. 28, Issue 12, p. 5595-5596.
Palmer, R.C., "Symbologies," The Bar Code Book, 2d ed., Chapter 4, Hehners Publishing, Inc., New Hampshire, 1991, pp. 15-59.
Schuessler, Rick, Using Extended Channel Interpretations (ECI's) for International Character Set Standardization, Scan-Tech Proceedings, Chicago, Nov. 1996, pp. 294-305.

The Unicode Standard Worldwide Character Encoding, Version 1, vol. 1, The Unicode Consortium, Addison-Wesley Publishing Company, Inc., Massachusetts, 1991, pp. 1-6, and 340.

Walker, Nathan, "ASCII-based compaction eases bar-code decoder's work," Electronic Design 30(22), 163-166, Oct. 1982.

Wang, "PDF417 Specification," Symbol Technologies, Inc., 1991.

AIM International, Inc., "International Symbology Specification—Data Matrix," May 8, 1997, 95 pages.

AIM International, Inc., "International Symbology Specification—MaxiCode," May 8, 1997, 44 pages.

Dallas Semiconductor, "50 Ways to Touch Memory," Second Edition, Oct. 1992, 93 pages.

Dallas Semiconductor, "50 Ways to Touch Memory," Third Edition, Aug. 1994, 95 pages.

\* cited by examiner

AUTOMATIC DATA COLLECTION DEVICE, METHOD AND ARTICLE

CROSS-REFERENCE TO RELATED APPLICATION

This application claims the benefit under 35 U.S.C. §119(e) of U.S. Provisional Patent Application No. 60/830,020 filed Jul. 11, 2006, and U.S. Provisional Patent Application No. 60/834,314 filed Jul. 28, 2006, the contents of which are both incorporated herein by reference in their entirety.

BACKGROUND

1. Field

This disclosure generally relates to automatic data collection (ADC) devices, methods and articles.

2. Description of the Related Art

The ADC field is generally directed to the use of devices and methods for automatically capturing data typically encoded in media such as a machine-readable symbol or tag carried by the item to which the data relates. A variety of ADC devices and ADC media are ubiquitous and well-known.

For example, a machine-readable data carrier may take the form of a machine-readable symbol, which may be selected from a variety of symbologies and which take the form of a bar code. Some bar coding systems employ standard message channel techniques, such as Basic Channel Model (BCM) techniques, to convey a message between components. Information describing the meaning of the data such as a serial number can be conveyed in the channel using standard techniques such as application identifiers, data identifiers, and text element identifiers. Some bar coding systems may employ out of channel techniques to convey additional information about the message, such as extended channel information (ECI) techniques, including the industry standard Extended Channel Model (ECM), which adds a layer to the BCM to convey additional information about the graphical representation of the data characters or whether the data characters have been compacted.

In another example, a machine-readable data carrier may take the form of a radio-frequency identification (RFID) device or tag, which may take the form of a card or a label. Such tags typically include an RFID substrate carrying circuitry such as a semiconductor device including memory and one or more conductive traces that form an antenna. Typically, RFID tags act as transponders, providing information stored in the semiconductor device in response to a radio-frequency (RF) signal, commonly referred to as an interrogation signal, received at the antenna from a reader or interrogator. Some RFID tags include security measures, such as passwords and/or encryption, which may be added at the system level. Many RFID tags also permit information to be stored in a semiconductor memory via an RF signal.

Due to the proliferation of RFID devices, methods and articles, and the frequent use of RFID devices in close proximity to each other, performance issues have arisen.

BRIEF SUMMARY

As mentioned above, the proliferation of RFID devices, methods and articles has led to performance issues. Some of these issues can be addressed through user intervention, but this approach is time consuming and expensive and raises compatibility issues.

Instead of passing commands manually, commands may be encoded into the message or into the message signal of the data carrier. Alternatively, commands may be passed out of the message signal channel. Moreover, existing symbol techniques can be modified to pass commands and/or additional information about the message out of the message signal channel. Currently there is no means of transporting commands to an RFID device through the use of another data carrier.

In one embodiment, a first machine-readable data carrier comprises an embedded command to control communication with a second machine-readable data carrier. An automatic data collection system is configured to extract the embedded command from the first data carrier and to execute the command to communicate with the second data carrier.

In one embodiment, a method of operating an automatic data collection system comprises extracting a command encoded in a first machine-readable data carrier, associating the command with a data payload of a second machine-readable data carrier and executing the command. In one embodiment, the method further comprises encoding the command in an out-of-channel message of the first data carrier. In one embodiment, extracting the command comprises reading a machine-readable symbol. In one embodiment, extracting the command comprises interpreting an extended-channel portion of the machine-readable symbol. In one embodiment, extracting the command comprises interpreting a character in the extended-channel portion of the machine-readable symbol. In one embodiment, extracting the command comprises interpreting a character in the machine-readable symbol. In one embodiment, the machine-readable symbol is a bar code. In one embodiment, executing the command comprises forwarding the command to a radio-frequency interrogator. In one embodiment, the method further comprises extracting information related to the second machine-readable data carrier from the first machine-readable data carrier. In one embodiment, the command comprises a read command, the information includes a radio-frequency identification device identifier, associating the command with the data payload of the second machine-readable data carrier comprises activating a reader to identify a radio-frequency identification device associated with the radio-frequency identification device identifier, and executing the command comprises reading the data payload of the identified radio-frequency identification device. In one embodiment, the command comprises a private/public keyed write command, the information includes a public key, and executing the command comprises retrieving a private key and writing data to the data payload of the second machine-readable data carrier. In one embodiment, the command comprises a retrieve a private key command. In one embodiment, the command comprises a write command.

In one embodiment, a first machine-readable data carrier comprises a machine-readable data payload and an embedded command to control communication with a second machine-readable data carrier. In one embodiment, the first machine-readable data carrier further comprises an extended-channel portion and the command is embedded in a character in the extended-channel portion. In one embodiment, the extended-channel portion comprises a different character identifying the second machine-readable data carrier. In one embodiment, a format of the first machine-readable data carrier comprises a machine-readable symbol format. In one embodiment, the format is a bar code format. In one embodiment, the command is embedded in the machine-readable data payload of the first machine-readable data carrier. In one embodiment, the first machine-readable data carrier further comprises a memory and the machine-readable data payload of the first machine-readable data carrier is stored in the memory. In one embodiment, the embedded command is a read command. In one embodiment, the embedded command is a write command. In one embodiment, the embedded command comprises a retrieve a private key command.

In one embodiment, an automatic data collection system comprises means for extracting from a first machine-readable data carrier a command to control communication with a second machine-readable data carrier, and means for executing the extracted command communicatively coupled to the means for extracting the command. In one embodiment, the automatic data collection system further comprises means for embedding the command in the first machine-readable data carrier. In one embodiment, the means for extracting comprises a symbol reader. In one embodiment, the symbol reader is a bar code reader. In one embodiment, the means for executing comprises a radio-frequency interrogator communicatively coupled to the symbol reader. In one embodiment, the means for extracting comprises a radio-frequency interrogator. In one embodiment, the means for executing comprises a symbol reader.

In one embodiment, a computer-readable memory medium stores instructions for causing a processor to operate an automatic data collection system by extracting a command encoded in a first machine-readable data carrier, associating the command with a data payload of a second machine-readable data carrier, and executing the command. In one embodiment, the instructions cause the processor to extract information identifying the second machine-readable data carrier from the first machine-readable data carrier. In one embodiment, the instructions cause the processor to extract the command from a portion of the first machine-readable data carrier. In one embodiment, the instructions cause the processor to extract the command from an out-of-channel portion of the machine-readable data carrier.

In one embodiment, a method of tracking an object comprises storing, in a first machine-readable data carrier, a command related to a data payload of a second machine-readable data carrier, and storing, in the second machine-readable data carrier, a first message related to the object. In one embodiment, the method further comprises storing, in the first machine-readable data carrier, a second message related to the object. In one embodiment, storing the command comprises printing a bar code symbol. In one embodiment, storing the first message comprises programming a radio-frequency identification device. In one embodiment, the method further comprises storing, in the first machine-readable data carrier, additional information related to the command. In one embodiment, storing the command comprises programming a radio-frequency identification device. In one embodiment, the method further comprises extracting the command from the first machine-readable data carrier, and executing the command. In one embodiment, executing the command comprises reading the first message. In one embodiment, storing the command comprises storing the command in an out-of-channel portion of the first machine-readable data carrier.

In one embodiment, a method of operating an automatic data collection system comprises extracting a command encoded in a machine-readable data carrier, associating the command with a data payload of the machine-readable data carrier and executing the command.

BRIEF DESCRIPTION OF THE SEVERAL VIEWS OF THE DRAWINGS

The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings.

DETAILED DESCRIPTION

In the following description, certain details are set forth in order to provide a thorough understanding of various embodiments of devices, methods and articles. However, one of skill in the art will understand that other embodiments may be practiced without these details. In other instances, well-known structures and methods associated with automatic data collection devices, methods and articles, such as readers, labels, printers, machine-readable symbols and portions thereof, RFID interrogators, RFID tags, RFID chips, semiconductor devices, RF signals, and antennas have not been shown or described in detail to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments.

The headings are provided for convenience only, and do not interpret the scope or meaning of this disclosure or the claims.

Figure 1:
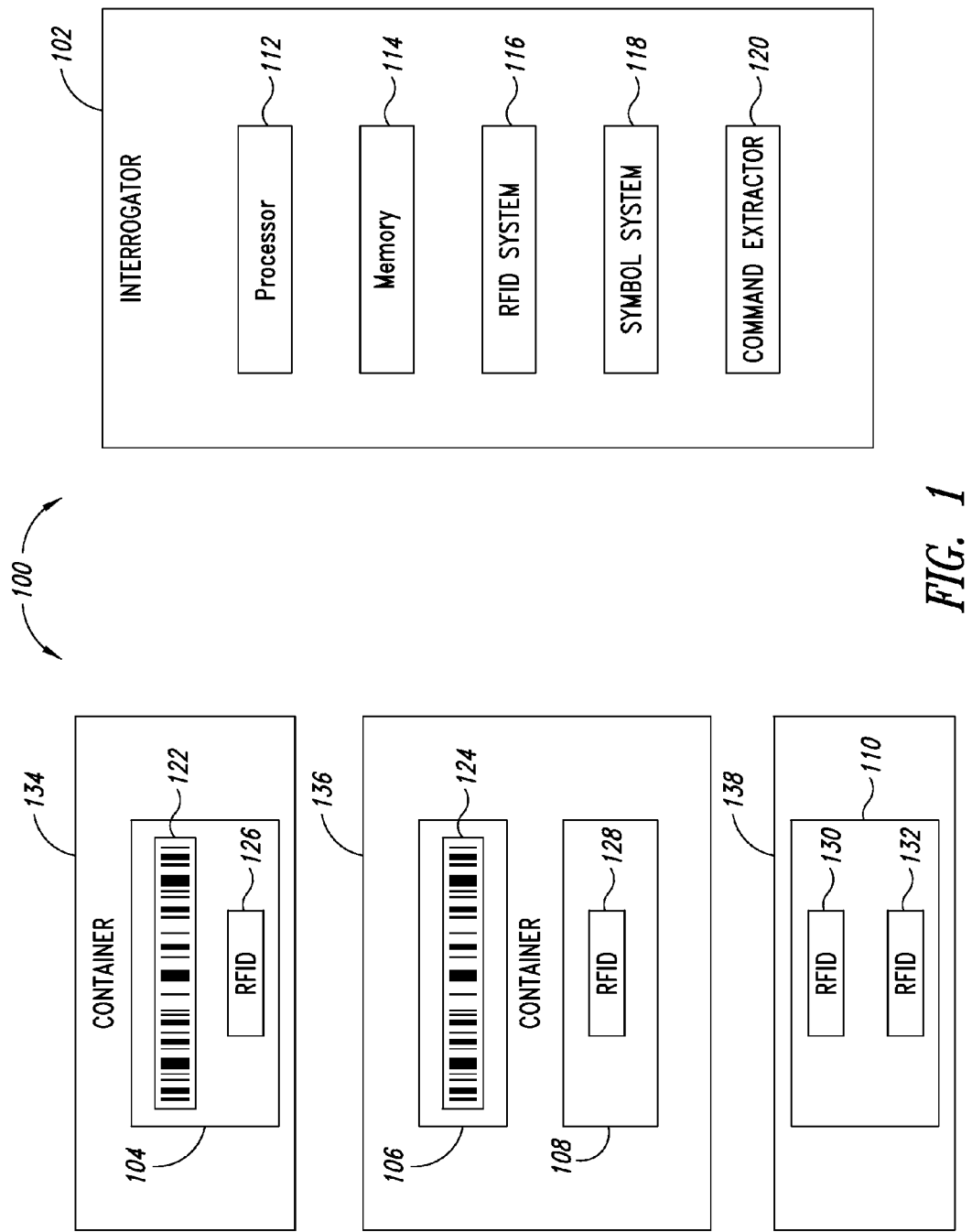
FIG. 1 is a functional block diagram of an embodiment of an ADC system in accordance with the present disclosure.

FIG. 1 is a functional block diagram of an ADC system 100 comprising an interrogator 102, and a plurality of substrates 104, 106, 108, 110. The interrogator 102 comprises a processor 112, a memory 114, an RFID system 116, a symbol system 118, and a command extractor 120. One or more of the substrates 104, 106, 108, 110 may comprise one or more symbols 122, 124 and/or one or more RFID devices 126, 128, 130, 132. As illustrated, a first substrate 104 comprises a symbol 122 and an RFID device 126, a second substrate 106 comprises a symbol 124, a third substrate 108 comprises an RFID device 128, and a fourth substrate 110 comprises two RFID devices 130, 132. The first substrate 104 is coupled to a first container 134, the second and third substrates 106, 108 are coupled to a second container 136 and the fourth substrate 110 is coupled to a third container 138. The substrates 104, 106, 108, 110 may be attached, associated with or coupled to objects other than containers. As discussed in more detail below, the command extractor 120 is configured to extract commands and/or related data from data carriers, such as the symbol 122, and to control operation of the interrogator 102 based on the extracted commands and/or data.

The RFID system 116, the symbol system 118 and the command extractor 120 may be implemented in a variety of ways, including as a combined control system or as separate subsystems. The RFID system 116, the symbol system 118 and the command extractor 120 may be implemented as one or more microprocessors, digital signal processors (DSP), application-specific integrated circuits (ASIC), or the like, or as a series of instructions stored in a memory, such as the memory 114, and executed by a controller, such as the processor 112, or various combinations of the above. Thus, software modifications to existing hardware may allow the implementation of the ADC system 100. Various subsystems, such as the command extractor 120, are identified as separate blocks in the functional block diagram of FIG. 1 because they perform specific functions that will be described in more detail below. These subsystems may be discrete units. For example, the command extractor 120 may be implemented with a discrete circuit. The subsystems also may not be discrete units but may be functions of a software routine, which will probably, but not necessarily, be separately callable and hence identifiable elements. The various subsystems may be combined. For example, all or portions of the command extractor 120 may be integrated into the symbol system 118. In another example, the RFID system 116 may be combined with the symbol system 118.

While the illustrated embodiment denotes a single processor 112 in the interrogator 102, other embodiments may comprise multiple processors. The memory 114 may comprise, for example, registers, read only memory ("ROM"), random access memory ("RAM"), flash memory and/or electronically erasable programmable read only memory ("EEPROM"), and may provide instructions and data for use by the interrogator 102 and/or the RFID and symbol sub-systems 116, 118.

Figure 2:
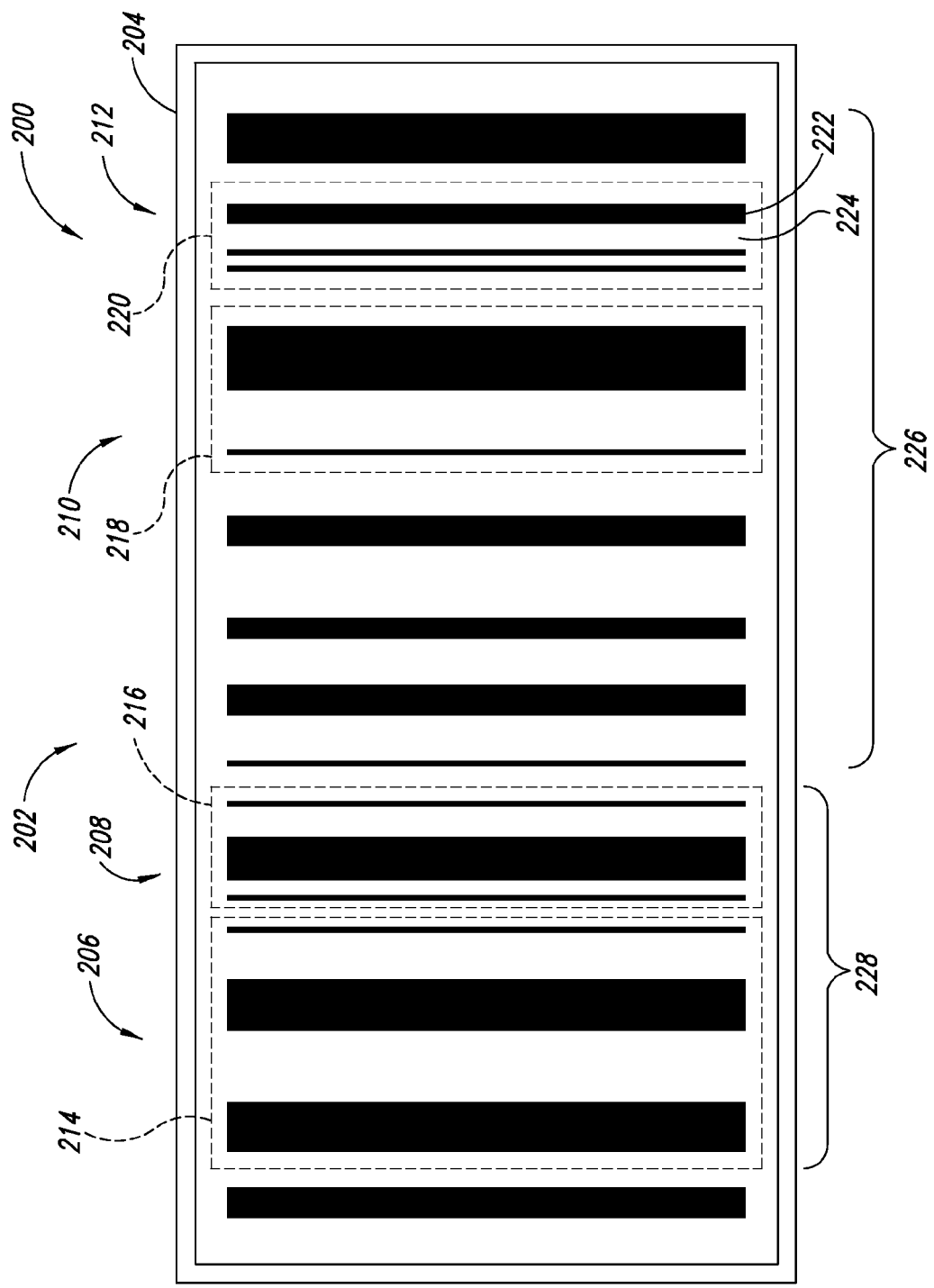
FIG. 2 is a functional block diagram of an embodiment of a machine-readable data carrier suitable for use with the embodiment of a system illustrated in FIG. 1.

FIG. 2 is a top plan view of an embodiment of machine-readable data carrier in the form of a machine-readable symbol 200 suitable for use, for example, in the embodiment of FIG. 1. As illustrated the symbol 200 comprises a bar code symbol 202 on a substrate 204. The bar code symbol 202 includes a number of characters, including four illustrative characters 206, 208, 210, 212 identified by the respective broken lines 214, 216, 218, 220. Each character is identified by a number of lines 222 and spaces 224. The symbol 200 comprises a message portion 226 and an extended channel portion 228. The symbol may comprise other portions, such as a quiet portion (not shown). Various symbol formats may be employed, such as the examples discussed in more detail in U.S. Pat. No. 6,371,375, entitled MEMORY AND APPARATUS FOR ASSOCIATING DATA WITH A WIRELESS MEMORY DEVICE, and issued to Ackley, et al. ("the '375 patent"). Additional example symbol formats are discussed in "International Technical Standard: Extended Channel Interpretations: Identification Schemes and Protocols," AMI Publication ITS/04-001 (May 24, 2004); "International Symbology Specification—93i," AMI Publication ITS/99-004 (Nov. 5, 1999); and "Information Technology—Automatic Identification and Data Capture Techniques—Bar Code Symbology Specifications," International Standard ISO/IEC15438, First Edition PDF417 (Sep. 15, 2001). Other symbol formats may be employed. As discussed below by way of several example embodiments, the machine-readable symbol 200 includes an embedded command associated with a data payload of another machine-readable data carrier.

Figure 3:
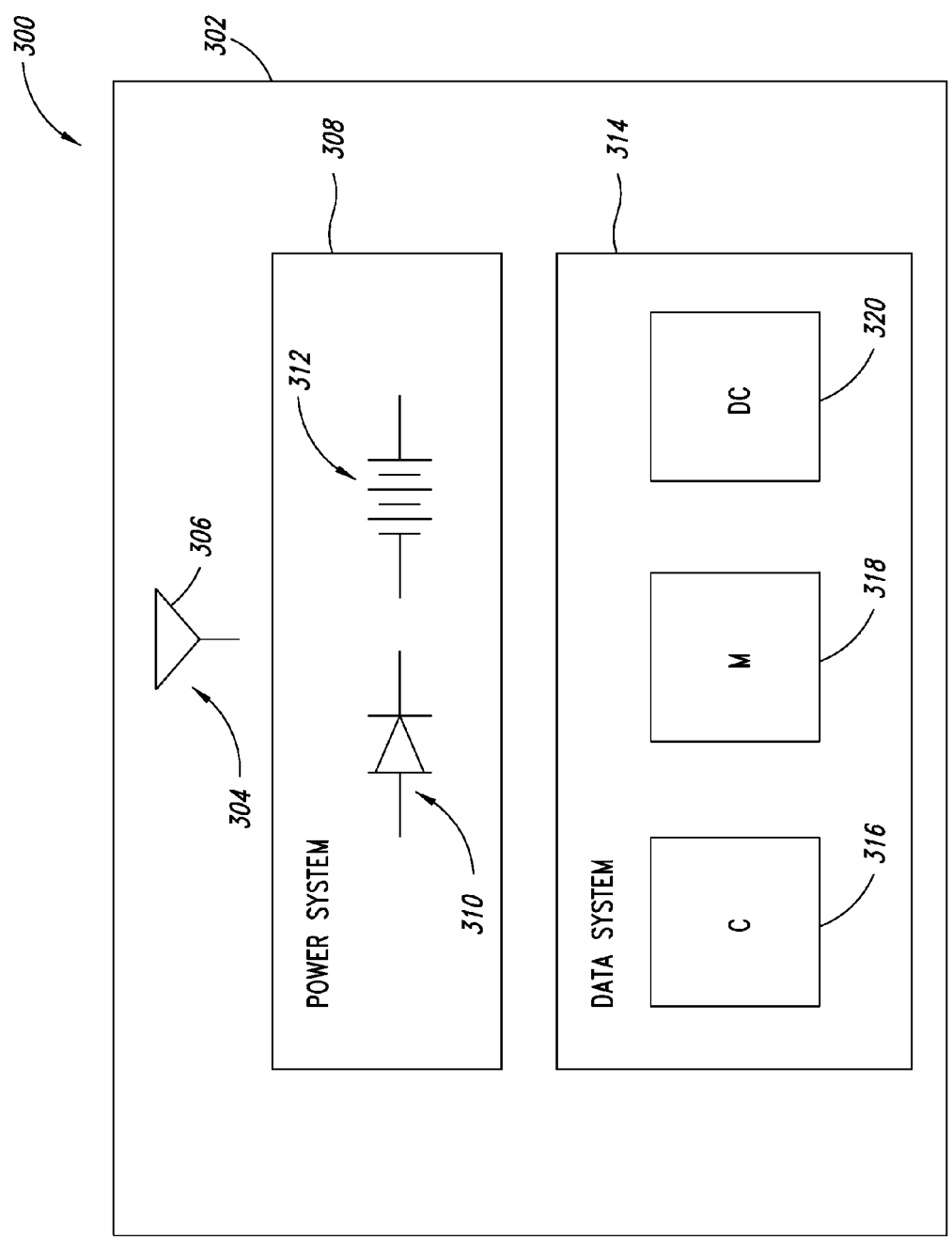
FIG. 3 is a functional block diagram of an embodiment of another machine-readable data carrier suitable for use with the embodiment of a system illustrated in FIG. 1.

FIG. 3 is a functional block diagram of a machine-readable data carrier in the form of an RFID device 300 suitable for use in the embodiment of FIG. 1. As illustrated the RFID device 300 comprises a substrate 302, an antenna system 304, which as illustrated comprises an antenna 306. The antenna system 304 sends and receives radio frequency signals and may comprise multiple antennas, multiple antenna arms, and parasitic or directional elements. The RFID device 300 as illustrated also comprises a power system 308, which as illustrated comprises an optional rectifier 310 and an optional battery 312. The power system 308 provides power to the RFID device 300 and may be configured to provide power in a passive and/or an active manner. The RFID device 300 also comprises a data system 314, which as illustrated comprises a controller 316, a memory 318 and discrete circuitry 320. Various configurations of RFID devices may be employed. As discussed below by way of several example embodiments, the RFID device 300 includes an embedded command associated with a data payload of another machine-readable data carrier.

Several illustrative embodiments of systems and machine-readable data carriers will be described with reference to FIGS. 1 through 3. For example, a data carrier, such as one of the symbols 122, 124, 200, or one of the RFID devices, such as RFID devices 126, 128, 130, 132, 300, may contain indications of commands for use by the system 100 to control communication of the interrogator with one or more other data carriers, such as one of the symbols 122, 124, 200, or one of the RFID devices 126, 128, 130, 132. In a typical application, a first data carrier associated with a container may contain a command that can be used by the system 100 to control interaction of the interrogator with another data carrier associated with the container. For example, symbol 122 may contain a command to cause the interrogator to read RFID device 126, RFID device 128 may contain a command to cause the interrogator to read the symbol 124, or RFID device 130 may contain a command to cause the interrogator to write to RFID device 132.

Several examples will be described in more detail for illustration purposes. In one example embodiment, a command may be extracted from information stored in a machine-readable data carrier, such as the symbol 122, for use by the system 100 to initiate and/or control interaction between the RFID system 116 and an RFID device, such as the RFID device 126. For example, with reference to FIG. 2, one or more characters in the extended channel portion 228 (e.g., character 206) may comprise an indication that the extended channel portion 228 comprises a command, and one or more characters in the extended channel portion 228 (e.g., character 208) may comprise the command. In some embodiments, the indication and the command may be combined into a single character (e.g., character 206). In some embodiments, one or more characters in the extended channel portion 228 may comprise a command (e.g., character 206) and one or more characters in the extended channel portion 228 may comprise information related to the command (e.g., character 208). In some embodiments, the command and the related information may be combined into a single character (e.g., character 206). Example commands include read, write, kill and password commands. Examples of command-related information include unique tag identifiers and passwords.

For example, the Extended Channel Interpretation (ECI) format employs transformation ECIs, which encode encryption or transformation information. ECI also employs transformation prefixes to encode random data, such as a reference to a regulation (e.g., "See EPA document 1234 for toxicity information"). In one example embodiment in the ECI format, a transformation prefix ECI (e.g., character 206) is used in conjunction with a transformation ECI (e.g., character 208) and a null-encryption scheme to communicate RFID instructions to a receiving system, such as the interrogator 102. For example, the symbol 200 of FIG. 2 may be employed as the symbol 122 in FIG. 1, and may comprise an ECI format symbol with characters modified to comprise commands and/or command-related information. For example, character 206 may comprise a transformation prefix ECI comprising an indication that a following transformation ECI (e.g., character 208) is a unique RFID tag identifier that is intended to be read in conjunction with the machine-readable symbol. A receiver (e.g., interrogator 102 in FIG. 1) may be configured to interpret this combination as a command to read an RFID tag with the unique RFID tag identifier (e.g., RFID device 126 or RFID device 128).

In another example embodiment in the ECI format, a transformation ECI (e.g., character 208) in a symbol (e.g., symbol 200) may comprise a command to read or write to an RFID tag identified in a message portion (e.g., message portion 226 of the symbol 200). The extended channel portion 228 is out of the symbol data channel, and thus avoids confusion between the data and the command.

In another example embodiment in an ECI format, a character (e.g. character 206) may comprise a transformation prefix ECI comprising an indication that a following transformation ECI (e.g., character 208) is a range of an RFID tag with a unique RFID tag identifier that is identified in a message portion (e.g., character 212 of message portion 226) of a symbol (e.g., symbol 200).

Other out-of-channel communication methods may be employed. Out-of-channel methods may be interpreted by a reader (such as the interrogator 102) after, before, during and/or without processing of the data payload, which can be advantageous because it can lead to reduced processing demands and faster system performance. For example, interpretation of the data payload may be performed by a host system. In another example, a reader may execute a command before the data payload is interpreted.

The commands may be embedded in the data payload in some embodiments. For example, with reference to FIG. 2, one or more characters in the message portion 226 (e.g., character 210) may comprise an indication that the message portion 226 comprises a command, and one or more characters in the message portion 226 (e.g., character 212) may comprise the command. In some embodiments, the indication and the command may be combined into a single character (e.g., character 210). In some embodiments, one or more characters in the message portion 226 may comprise a command (e.g., character 210) and one or more characters may comprise information related to the command (e.g., character 212). In some embodiments, the command and the related information may be combined into a single character (e.g., character 210).

For example, the message portion 226 may employ identifiers that contain information about the data, such as industry standard identifiers, including data identifiers, application identifiers, and text element identifiers. These identifiers can be modified to include commands and/or data related to commands, either in addition to, or instead of, the usual labels or information contained in the identifiers. For example, with reference to symbol 200 of FIG. 2 being employed as symbol 122 of FIG. 1, character 210 may comprise a data identifier that has been modified to comprise an indication that one or more other characters (e.g., character 212) comprise an identifier for an RFID device (e.g., RFID device 126) that should be read in conjunction with the symbol 122. The interrogator 102 may be configured to interpret this combination as a command to read the RFID device 126. In another example, a character may comprise an identifier, such as a data identifier, that has been modified to indicate that another character, such as a character immediately following the character, comprises a command.

In another example, with reference to FIG. 3, an RFID device 300 may be configured to respond to an interrogation signal with an indication of a command to be executed by a system, such as the system 100, with respect to another data carrier, such as a symbol or another RFID device. The indication of a command may be stored in the memory 318 and transmitted by the RFID device in response to an interrogation signal. The indication of a command may be transmitted as part of a data payload of the RFID device, or as a separate indication of a command. For example, the RFID device 300 may be configured to transmit the command at a first frequency and to transmit a data payload at a second frequency. The data payload of the RFID device may contain both a message portion and an out-of-channel portion. Thus, RFID devices may contain both in-channel and out-of-channel command messages or indications. The data payload of an RFID device may also employ extended channel portions and/or standard identifiers, such as application identifiers, data identifiers, and text element identifiers. These extended channel portions and/or identifiers may, for example, be modified to comprise an indication of a command and/or information related to a command. Transmission of a command message or indication may also include command-related information, such as an associated unique RFID tag identifier.

In one embodiment, a machine-readable data carrier, such as, for example, the bar code 200 illustrated in FIG. 2 or the RFID device 300 illustrated in FIG. 3, may comprise an embedded command to be executed by a system with respect to the same machine-readable data carrier. As discussed above, the indication, command, and/or related information may be embedded in an in-channel or in an out-of-channel portion of a data payload, and standard identifiers may be modified to comprise the embedded indication, command and/or related information. Several examples will be discussed with respect to FIGS. 1 and 3. For example, the RFID device 300 may contain an embedded command or indication of a command to cause an interrogator, such as the interrogator 102 illustrated in FIG. 1, to execute the command with respect to the RFID device 300. For example, the data payload of the RFID device 300 may have an embedded command that causes the interrogator 102 to issue a kill command to the RFID device 300 after reading the message portion of the payload from the RFID device 300. In another example, the data payload of an RFID device 300 may comprise an embedded indication of a command that causes the interrogator 102 to issue a write command to the RFID device 300. The write command may, for example, cause the RFID device to store all zeros in its data payload, or to store an indication that it was read by the interrogator in its data payload. In another example, the data payload of an RFID device 300 may comprise an embedded command to change the password or the encryption key of the RFID device 300.

Figure 4:
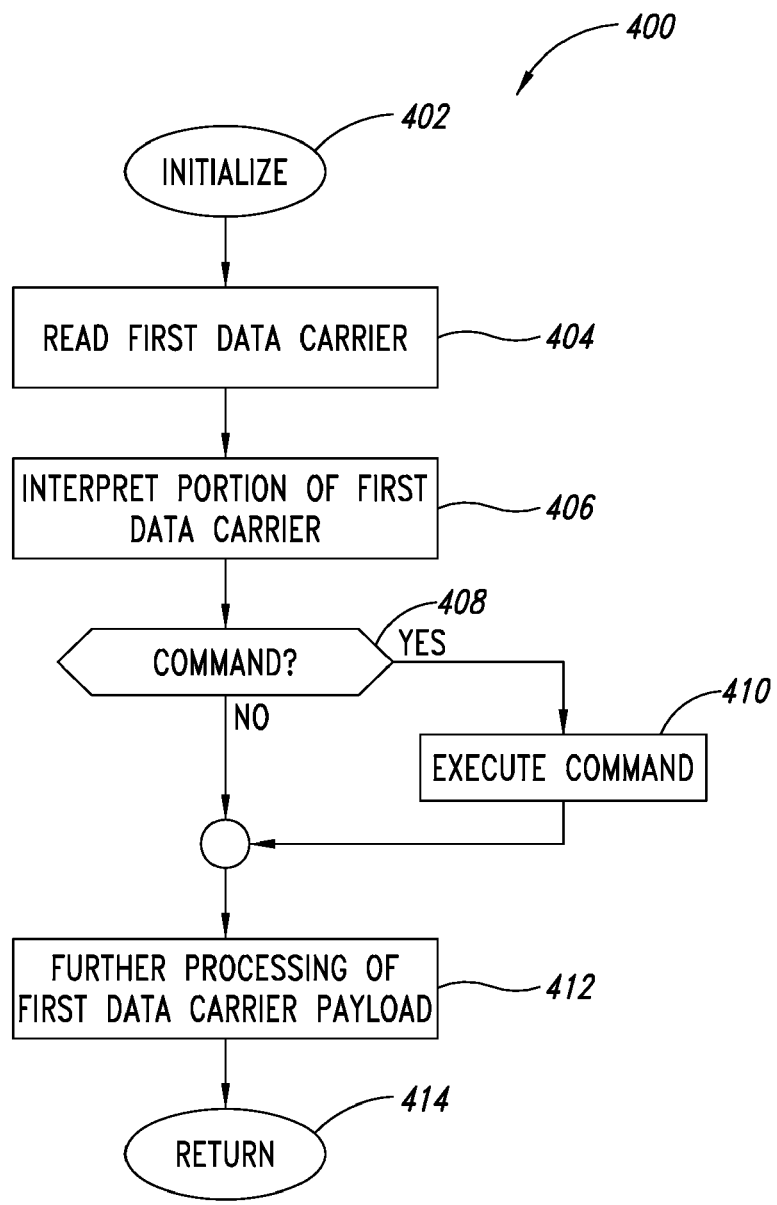
FIG. 4 is a high-level flow diagram of an embodiment of a method of operating an ADC system in accordance with the present disclosure.

FIG. 4 is a high-level flow chart illustrating an example embodiment of a method 400 of operating an ADC system, such as the ADC system 100 illustrated in FIG. 1, to use command information extracted from a first data carrier to control how the system 100 handles a second data carrier. At 402 the system 100 initializes and proceeds to 404. At 404, the system 100 reads at least a portion of a first data carrier. The portion read may be an in-channel portion of an out-of-channel portion. For example, the system 100 may read an extended channel portion of the symbol 200 of FIG. 2. In another example, the system 100 may read a signal from a first RFID device, such as RFID device 130. The method proceeds from 404 to 406. At 406 the system 100 interprets the portion of the first data carrier that has been read, such as one or more characters contained in an extended channel portion 228 of the symbol 200 illustrated in FIG. 2. The method 400 proceeds from 406 to 408. At 408, the system 100 determines whether the portion read contains an indication of a command related to another data carrier. This may be done, for example, by determining whether an out-of-channel character, such as the character 206 in the extended channel portion 228 of the symbol 200 in FIG. 2, comprises a command or an indication of a command.

When the system 100 determines that the portion contains a command or an indication of a command related to another data carrier, the method 400 proceeds from 408 to 410. At 410, the system 100 executes the command, such as a command to read an RFID device associated with a symbol. The method 400 proceeds from 410 to 412.

When the system 100 determines that the portion read does not contain a command or an indication of a command, the method 400 proceeds from 408 to 412. At 412, the system 100 performs further processing of the first data carrier, if appropriate, such as transmitting the data payload and associated encryption information to a host system. In another example, an interrogator may be configured to decrypt a data payload and transmit the decrypted payload to a host system. The method 400 proceeds from 412 to 414, where the method returns the value of any desired information and may perform other processing.

Embodiments of the method discussed in FIG. 4 may contain additional acts not shown in FIG. 4, may not contain all of the acts shown in FIG. 4, may perform acts shown in FIG. 4 in various orders, and may combine acts shown in FIG. 4. For example, the embodiment illustrated in FIG. 4 may be modified to process the first data carrier payload while or before an out-of-channel message is interpreted.

Figure 5:
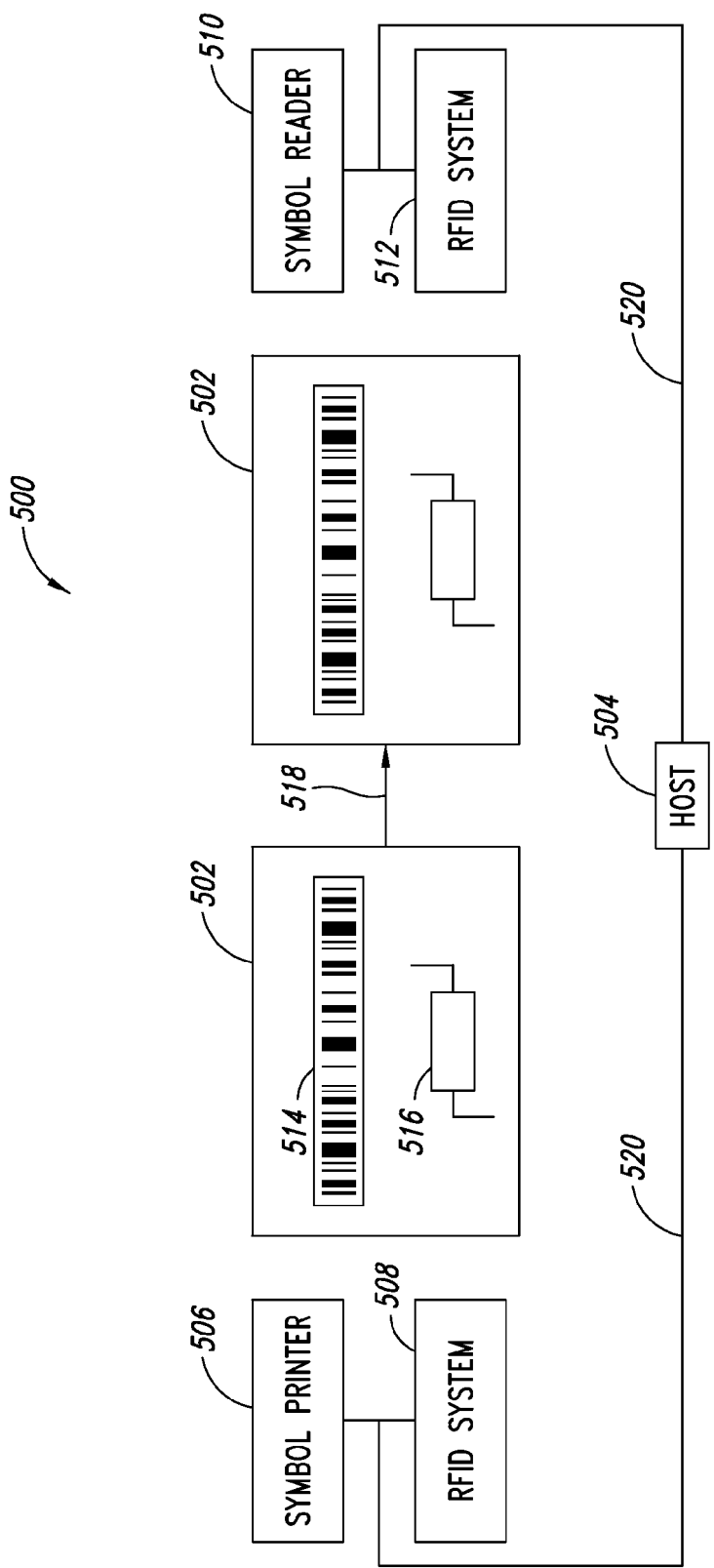
FIG. 5 is a functional block diagram of another embodiment of an ADC system in accordance with the present disclosure.

FIG. 5 is a functional block diagram of an ADC system 500 configured to track an object 502, such as the containers 134, 136, 138 illustrated in FIG. 1. The system 500 comprises a host 504, a symbol printer 506, a first RFID system 508, a symbol reader 510 and a second RFID system 512. The symbol printer 506 is configured to print a symbol 514 associated with the object 502. As illustrated, the symbol 514 is a bar code symbol printed on a label affixed to the object 502. The first RFID system 508 is configured to read and/or program an RFID device 516 associated with the object 502. As illustrated, the RFID device 516 is an RFID tag affixed to the object 502. The object 502 may then be shipped to another location, which is illustrated by the arrow 518. The symbol reader 510 is configured to read the symbol 514 associated with the object 502. The second RFID system 512 is configured to read and/or program the RFID device 516 associated with the object 502. The host 504, symbol printer 506, first RFID system 508, symbol reader 510 and the second RFID system 512 as illustrated are communicatively coupled together through a communication system 520.

The host 504, symbol printer 506, first RFID system 508, the symbol reader 510 and the second RFID system 512 may be implemented in a variety of ways, including as a combined system or as separate subsystems. The host 504, symbol printer 506, first RFID system 508, the symbol reader 510 and the second RFID system 512 may be implemented using one or more microprocessors, digital signal processors (DSP), application-specific integrated circuits (ASIC), or the like, or as a series of instructions stored in one or more memories (see memory 114 in FIG. 1), and executed by one or more controllers (see processor 112 in FIG. 1), or various combinations of the above. Thus, software modifications to existing hardware may allow the implementation of the ADC system 500.

Figure 6:
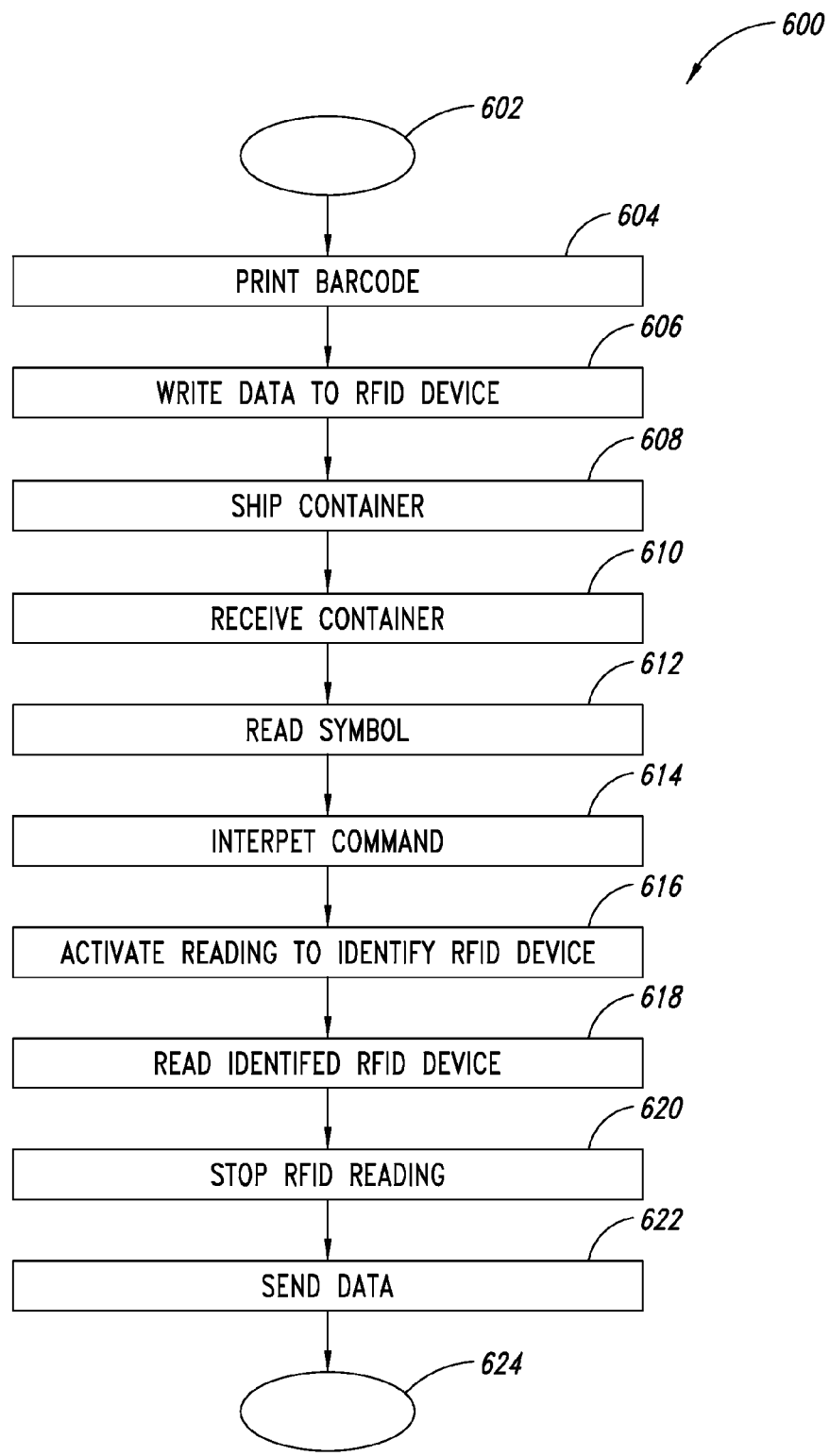
FIG. 6 is a mid-level flow diagram of another embodiment of a method of operating an ADC system in accordance with the present disclosure.

FIG. 6 is a mid-level flow diagram for an embodiment of a method 600 of operating an ADC system to track an object, such as the containers 134, 136, 138 illustrated in FIG. 1, in accordance with the present disclosure. For convenience, the method 600 will be described with reference to the ADC system 500 illustrated in FIG. 5.

The method 600 initializes at 602 and proceeds to 604. At 604, the system 500 prints a symbol associated with an object. The symbol includes an out-of-channel command, such as a read command associated with an RFID identifier, which may be unique. For this description of an example embodiment, the command is assumed to be a read command associated with a unique RFID identifier. Other commands may be included in the symbol with or instead of the read command. The symbol may typically take the form of a bar code symbol, which is typically affixed to the object or to a container for the object. The method 600 proceeds from 604 to 606.

At 606, the system 500 programs an RFID device associated with the object. The programming may include programming the unique RFID identifier, or the unique identifier may already be programmed into the RFID device. The RFID device may typically take the form of an RFID tag, which is typically affixed to the object or to a container for the object. The method 600 proceeds from 606 to 608.

At 608, the object is moved to a new location. Typically, the object, which may be inside a container, is shipped to a new location. The method 600 proceeds from 608 to 610. At 610, the object is received at the new location. The method 600 proceeds from 610 to 612.

At 612, the system 500 reads the symbol. Typically, the symbol is read by a bar code reader. The method proceeds from 612 to 614. At 614, the system 500 interprets the out-of-channel command contained within the symbol. In this example, the system 500 interprets the command as a command to read an RFID tag with the unique RFID identifier. The method 600 proceeds from 614 to 616.

At 616, the system 500 causes an RFID system (e.g., the second RFID system 512 in FIG. 5) to read RFID devices within range until a device with the desired RFID identifier is found. The method 600 proceeds from 616 to 618. At 618, the system 500 reads the data in the RFID device with the desired RFID identifier. The method 600 proceeds from 618 to 620. At 620, the system 500 causes the RFID system to stop reading. The method 600 proceeds from 620 to 622.

At 622, the system 500 returns any desired data. For example, the system 500 may provide data read by the symbol reader 510 and the second RFID system 512 to the host 504. The method 600 proceeds from 622 to 624, where the method 600 may perform other processing.

The method 600 illustrated in FIG. 6 may be advantageously employed to reduce the power consumption by the system and/or to reduce the likelihood of interference between the system 500 and other devices, such as neighboring systems. For example, the method 600 may reduce the amount of time an RFID system actively searches for an RFID device. In another example, the out-of-channel read command may specify a range of the RFID device with the desired RFID identifier, and the system 500 may use this information to use an appropriate power level to search for the RFID device.

Embodiments of the method discussed in FIG. 6 may contain additional acts not shown in FIG. 6, may not contain all of the acts shown in FIG. 6, may perform acts shown in FIG. 6 in various orders, and may combine acts shown in FIG. 6. For example, the embodiment illustrated in FIG. 6 may be modified to interpret a command in an in-channel data identifier at 614. In another example, the embodiment illustrated in FIG. 6 may be modified to process the symbol while an out-of-channel message is interpreted. In another example, the embodiment of a method 600 illustrated in FIG. 6 may be modified to process other embedded commands and/or to determine whether symbols contain embedded commands (see FIG. 4).

Figure 7:
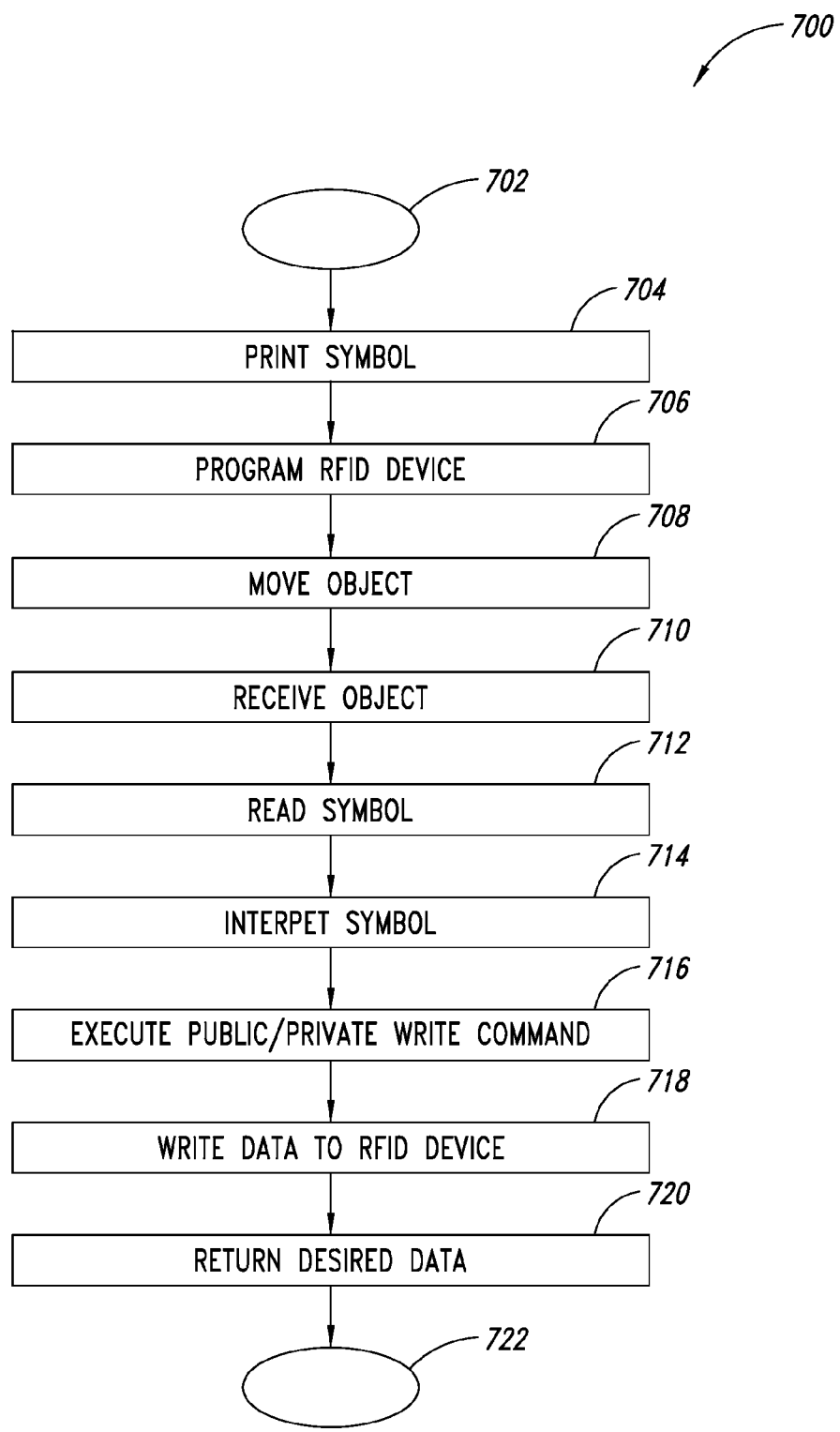
FIG. 7 is a mid-level flow diagram of another embodiment of a method of operating an ADC system in accordance with the present disclosure.

FIG. 7 is a mid-level flow diagram for another embodiment of a method 700 of operating an ADC system to track an object, such as the containers 134, 136, 138 illustrated in FIG. 1. For convenience, the method 700 will be described with reference to the ADC system 500 illustrated in FIG. 5.

The method 700 initializes at 702 and proceeds to 704. At 704, the system 500 prints a symbol associated with an object. The symbol includes an out-of-channel command, such as a public/private key write command. The symbol may typically take the form of a bar code symbol, which is typically affixed to the object or to a container for the object. For this example embodiment, the command is assumed to be a public/private key write command associated with a unique RFID identifier, a public key and a private key. The unique identifier may be embedded in an out-of-channel or an in-channel character. Similarly, the public key may be embedded in an out-of-channel message and/or an in-channel message. Alternatively, the public key may be known to a receiving system, such as the second RFID system 512. The private key will typically not be included in the symbol, but will need to either be known to a receiving system, or retrievable by a receiving system. The symbol may include out-of-channel or in-channel information identifying where or how to retrieve the private and/or the public keys. The method 700 proceeds from 704 to 706.

At 706, the system 500 programs an RFID device associated with the object. In this example, the programming includes programming a public key and a private key. The programming may include programming the unique RFID identifier, or the unique identifier may already be programmed into the RFID device. The RFID device may be configured to respond to an interrogation signal only when the signal includes the public key and the private key. The RFID device may typically take the form of an RFID tag, which is typically affixed to the object or to a container for the object. The method 700 proceeds from 706 to 708.

At 708, the object is moved to a new location. Typically, the object is shipped to a new location. The method 700 proceeds from 708 to 710. At 710, the object is received at the new location. The method 700 proceeds from 710 to 712.

At 712, the system 500 reads the symbol. Typically, the symbol is read by a bar code reader. The method proceeds from 712 to 714. At 714, the system 500 interprets the out-of-channel command contained within the symbol. In this example, the system 500 interprets the command as a write command associated with the public/private key and the RFID identifier, and causes the command to be executed. This may be done, for example, by generating a signal to cause an RFID system, such as the second RFID system 512 illustrated in FIG. 5, to execute the command. The method 700 proceeds from 714 to 716.

At 716, the system 500 causes an RFID system (e.g., the second RFID system 512 in FIG. 5) to retrieve the public/private key, for example, by retrieving the public portion from the symbol reader 510 and the private portion from the host 504 illustrated in FIG. 5, combine the public and private keys and to transmit the keys together with a write command to the RFID device with the desired RFID identifier. The method 700 proceeds from 716 to 718. At 718, the system 500 writes the desired data into the RFID device with the associated RFID identifier. The method 700 proceeds from 718 to 720. At 720, the system 500 returns any desired data. For example, the system 500 may provide data read by the symbol reader 510 and the second RFID device 512 to the host 504. The method 700 proceeds from 720 to 722, where the system 500 may perform other processing.

The method 700 illustrated in FIG. 7 may be advantageously employed to reduce the bandwidth used for password protection in RFID devices. Embodiments of the method discussed in FIG. 7 may contain additional acts not shown in FIG. 7, may not contain all of the acts shown in FIG. 7, may perform acts shown in FIG. 7 in various orders, and may combine acts shown in FIG. 7. For example, the embodiment illustrated in FIG. 7 may be modified to interpret a command in an in-channel data identifier at 714. In another example, the embodiment illustrated in FIG. 7 may be modified to process the symbol while an out-of-channel message is interpreted. In another example, the embodiment of a method 700 illustrated in FIG. 7 may be modified to process other embedded commands and/or to determine whether symbols contain embedded commands (see FIG. 4).

Figure 8:
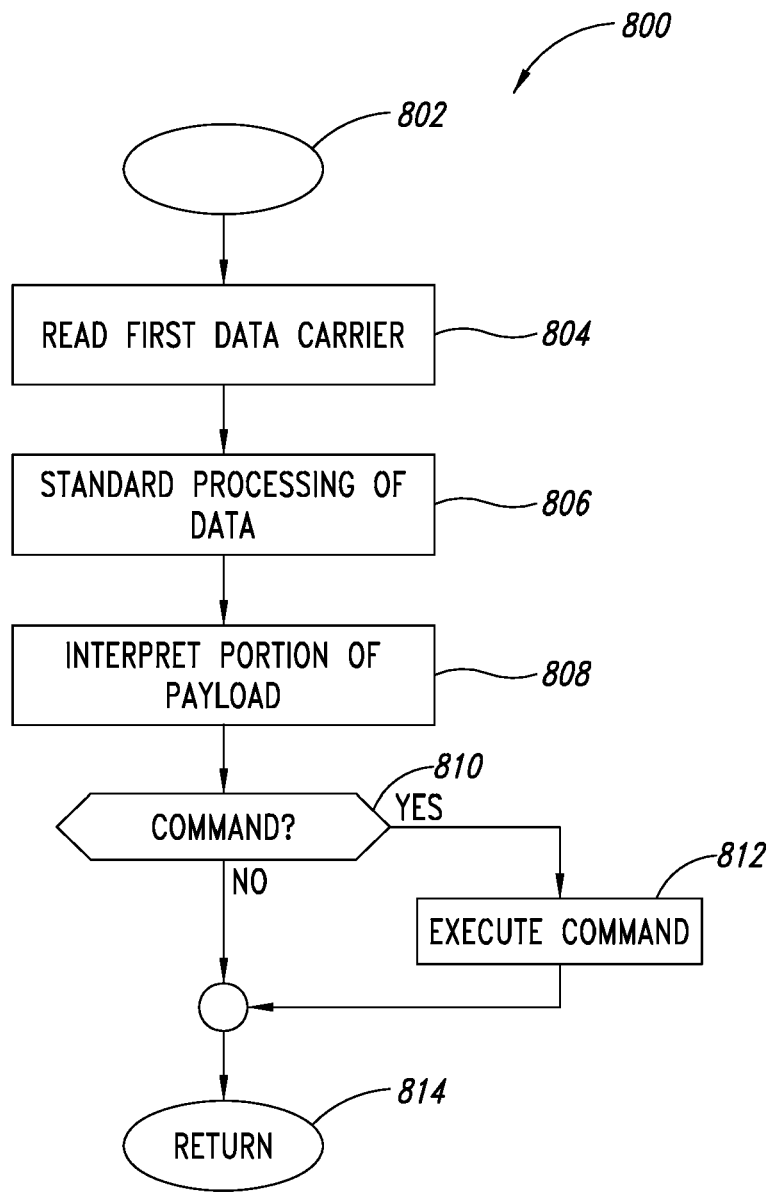
FIG. 8 is a high-level flow diagram of an embodiment of a method of operating an ADC system in accordance with the present disclosure.

FIG. 8 is a high-level flow chart illustrating an example embodiment of a method 800 of operating an ADC system, such as the ADC system 100 illustrated in FIG. 1, to use command information extracted from a first data carrier, such as the RFID device 126 illustrated in FIG. 1, to issue a command to the first data carrier. At 802 the system 100 initializes and proceeds to 804. At 804, the system 100 reads the first data carrier. The method proceeds from 804 to 806. At 806 the system 100 performs standard processing of the data payload of the first data carrier, such as transmitting the data payload and associated encryption information to a host system. The method 800 proceeds from 806 to 808. At 808, the system 100 interprets at least a portion of the data payload that has been read, such as, for example, one or more characters contained in an extended channel portion of the data payload of the RFID device 126. The method 800 proceeds from 808 to 810. At 810, the system 100 determines whether the interpreted portion comprises an indication of a command related to the data carrier. This may be done, for example, by determining whether a standard identifier, such as an application identifier, a data identifier, or a text element identifier, has been modified to comprise an indication of a command, a command, and/or data pertaining to a command, such as a private encryption key. In some embodiments, data pertaining to a command may serve as the command or the indication of the command. In some embodiments, a command or indication of a command may be encoded in a first identifier and data pertaining to the command may be encoded in a second identifier.

When the system 100 determines that the portion contains an embedded command or an embedded indication of a command related to the data carrier, the method 800 proceeds from 810 to 812. At 812, the system 100 executes the embedded command, such as, for example, a kill command instructing the RFID device 126 to no longer respond to interrogation signals. In another example, the indication of the command may be an indication that the RFID device 126 will turn itself off after transmitting the payload, and the command may be a command to cause the system 100 to advise a host that the RFID device 126 has turned itself off. In another example, the embedded command may be a command to change the password of the RFID device 126. The method 800 proceeds from 812 to 814, where the method returns the value of any desired information and terminates or continues with other processing.

When the system 100 determines that the portion does not contain an embedded command or an indication of a command, the method 800 proceeds from 810 to 814, where the method returns the value of any desired information and terminates or continues with other processing.

Embodiments of the method discussed in FIG. 8 may contain additional acts not shown in FIG. 8, may not contain all of the acts shown in FIG. 8, may perform acts shown in FIG. 8 in various orders, and may combine acts shown in FIG. 8. For example, the embodiment illustrated in FIG. 8 may be modified to simultaneously perform standard processing of the first data carrier payload while interpreting a portion of the data payload.

Although specific embodiments of and examples for the ADC devices, methods, and articles are described herein for illustrative purposes, various equivalent modifications can be made without departing from the spirit and scope of this disclosure, as will be recognized by those skilled in the relevant art. The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, including, but not limited to: U.S. Pat. No. 6,371,375, entitled MEMORY AND APPARATUS FOR ASSOCIATING DATA WITH A WIRELESS MEMORY DEVICE, and issued to Ackley, et al. ("the '375 patent"); U.S. patent application Ser. No. 11/191,616, entitled AUTOMATIC DATA COLLECTION DEVICE, METHOD AND ARTICLE, and filed by Nikitin, et al.; "International Technical Standard: Extended Channel Interpretations: Identification Schemes and Protocols," AMI Publication ITS/04-001 (May 24, 2004); "International Symbology Specification—93i," AMI Publication ITS/99-004 (Nov. 5, 1999); "Information Technology—Automatic Identification and Data Capture Techniques—Bar Code Symbology Specifications," International Standard ISO/IEC15438, First Edition PDF417 (Sep. 15, 2001); "Transfer Syntax for High Capacity Media," International Standard ISO 15434 FDIS (Feb. 5, 1999); and ISO/PDTS 21849, Second Edition (Mar. 27, 2002), are incorporated herein by reference, in their entirety. Aspects of the disclosure and embodiments can be modified, if necessary, to employ systems, circuits and concepts of the various patents, applications, and publications to provide yet further embodiments.

These and other changes can be made to the invention in light of the above-detailed description. In general, in the following claims, the terms used should not be construed to limit the invention to the specific embodiments disclosed in the specification and the claims. Accordingly, the invention is not limited by the disclosure, but instead its scope is to be determined entirely by the following claims.

What is claimed is:

1. A method of operating an automatic data collection system, comprising:
encoding a command in an out-of-channel message of a first machine readable data carrier;
extracting the command encoded in the first machine-readable data carrier;
associating the command with a data payload of a second machine-readable data carrier identified by data encoded in the first machine-readable data carrier; and
executing the command.

2. The method of claim 1, further comprising:
extracting information related to the second machine-readable data carrier from the first machine-readable data carrier.

3. The method of claim 1 wherein the command comprises a write command.

4. The method of claim 1 wherein extracting a command encoded in a first machine-readable data carrier includes extracting a command encoded in one of a machine-readable symbol or an RFID device, and associating the command with a data payload of a second machine-readable data carrier includes associating the command with the other one of the machine-readable symbol or the RFID device.

5. A method of operating an automatic data collection system, comprising:
extracting a command encoded in a first machine-readable data carrier, wherein extracting the command comprises reading a machine-readable symbol;
associating the command with a data payload of a second machine-readable data carrier identified by data encoded in the first machine-readable data carrier; and
executing the command.

6. The method of claim 5 wherein extracting the command comprises interpreting an extended-channel portion of the machine-readable symbol.

7. The method of claim 6 wherein extracting the command comprises interpreting a character in the extended-channel portion of the machine-readable symbol.

8. The method of claim 5 wherein extracting the command comprises interpreting a character in the machine-readable symbol.

9. The method of claim 5 wherein the machine-readable symbol is a bar code.

10. The method of claim 5 wherein the command comprises a write command.

11. A method of operating an automatic data collection system, comprising:
extracting a command encoded in a first machine-readable data carrier;
extracting information related to a second machine-readable data carrier from the first machine-readable data carrier;
associating the command with a data payload of the second machine-readable data carrier identified by data encoded in the first machine-readable data carrier; and
executing the command, wherein,
the command comprises a read command;
the information includes a radio-frequency identification device identifier;
associating the command with the data payload of the second machine-readable data carrier comprises activating a reader to identify a radio-frequency identification device associated with the radio-frequency identification device identifier; and executing the command comprises reading the data payload of the identified radio-frequency identification device.

12. The first machine-readable data carrier of claim 11, further comprising:
encoding the command in an out-of-channel message of the first data carrier.

13. A method of operating an automatic data collection system, comprising:
extracting a command encoded in a first machine-readable data carrier;
extracting information related to a second machine-readable data carrier from the first machine-readable data carrier;
associating the command with a data payload of the second machine-readable data carrier identified by data encoded in the first machine-readable data carrier; and
executing the command, wherein,
the command comprises a private/public keyed write command;
the information includes a public key; and
executing the command comprises:
retrieving a private key; and
writing data to the data payload of the second machine-readable data carrier.

14. The method of claim 13, further comprising encoding the command in an out-of-channel portion of the first machine-readable data carrier.

15. A method of operating an automatic data collection system, comprising:
extracting a command encoded in a first machine-readable data carrier;
associating the command with a data payload of a second machine-readable data carrier identified by data encoded in the first machine-readable data carrier; and
executing the command, wherein the command comprises a retrieve a private key command.

16. The method of claim 15, further comprising encoding the command in an out-of-channel message of the first data carrier.

17. A first machine-readable data carrier, comprising:
a machine-readable data payload;
an embedded command to control communication with a second machine-readable data carrier; and
an extended-channel portion, wherein the command is embedded in a character in the extended-channel portion.

18. The first machine-readable data carrier of claim 17 wherein the extended-channel portion comprises a different character identifying the second machine-readable data carrier.

19. The first machine-readable data carrier of claim 17 wherein the embedded command is a read command.

20. The first machine-readable data carrier of claim 17 wherein the embedded command is a write command.

21. The first machine-readable data carrier of claim 17 wherein the machine-readable data payload specifies an identity of the second machine-readable data carrier.

22. A method of operating an automatic data collection system, comprising:
extracting a command encoded in a first machine-readable data carrier;
associating the command with a data payload of a second machine-readable data carrier identified by data encoded in the first machine-readable data carrier; and
executing the command, wherein executing the command comprises forwarding the command to a radio-frequency interrogator.

23. The method of claim 22, further comprising:
encoding the command in an out-of-channel message of the first data carrier.

24. A first machine-readable data carrier, comprising:
a machine-readable data payload; and
an embedded command to control communication with a second machine-readable data carrier, wherein a format of the first machine-readable data carrier comprises a machine-readable symbol format.

25. The first machine-readable data carrier of claim 24 wherein the format is a bar code format.

26. The first machine-readable data carrier of claim 24 wherein the command is embedded in the machine-readable data payload of the first machine-readable data carrier.

27. The first machine-readable data carrier of claim 24, further comprising:
a memory, wherein the machine-readable data payload of the first machine-readable data carrier is stored in the memory.

28. A first machine-readable data carrier, comprising:
a machine-readable data payload; and
an embedded command to control communication with a second machine-readable data carrier, wherein the embedded command comprises a retrieve a private key command.

29. An automatic data collection system, comprising:
means for extracting from a first machine-readable data carrier a command to control communication with a second machine-readable data carrier wherein the means for extracting comprises a symbol reader; and
means for executing the extracted command with respect to the second machine-readable data carrier which second readable data carrier is identified by data encoded in a data payload of the first machine-readable data carrier communicatively coupled to the means for extracting the command.

30. The automatic data collection system of claim 29, further comprising:
means for embedding the command in the first machine-readable data carrier.

31. The automatic data collection system of claim 29 wherein the symbol reader is a bar code reader.

32. The automatic data collection system of claim 29 wherein the means for executing comprises a radio-frequency interrogator communicatively coupled to the symbol reader.

33. The automatic data collection system of claim 29 wherein the means for extracting comprises a radio-frequency interrogator.

34. An automatic data collection system, comprising:
means for extracting from a first machine-readable data carrier a command to control communication with a second machine-readable data carrier; and
means for executing the extracted command with respect to the second machine-readable data carrier which second readable data carrier is identified by data encoded in a data payload of the first machine-readable data carrier communicatively coupled to the means for extracting the command, wherein the means for executing comprises a symbol reader.

35. A non-transitory computer-readable memory medium that stores instructions for causing a processor to operate an automatic data collection system by,
extracting a command encoded in an out-of-channel portion of a first machine-readable data carrier;

associating the command with a data payload of a second machine-readable data carrier identified by data encoded in the first machine-readable data carrier; and executing the command.

36. The non-transitory computer-readable memory medium of claim 35 wherein the instructions cause the processor to extract information identifying the second machine-readable data carrier from the first machine-readable data carrier.

37. A method of tracking an object, comprising:

storing, in a first machine-readable data carrier, a command related to a data payload of a second machine-readable data carrier, wherein storing the command comprises printing a bar code symbol; and storing, in the second machine-readable data carrier, a first message related to the object.

38. The method of claim 37, further comprising:

storing, in the first machine-readable data carrier, a second message related to the object.

39. The method of claim 37 wherein storing the first message comprises programming a radio-frequency identification device.

40. The method of claim 37, further comprising:

storing, in the first machine-readable data carrier, additional information related to the command.

41. The method of claim 37, further comprising:

extracting the command from the first machine-readable data carrier; and executing the command.

42. The method of claim 41 wherein executing the command comprises reading the first message.

43. A method of tracking an object, comprising:

storing, in a first machine-readable data carrier, a command related to a data payload of a second machine-readable data carrier, wherein storing the command comprises storing the command in an out-of-channel portion of the first machine-readable data carrier; and storing, in the second machine-readable data carrier, a first message related to the object.

44. The method of claim 43 wherein storing the command further comprises programming a radio-frequency identification device.

45. A method of operating an automatic data collection system, comprising:

extracting a command encoded in a machine-readable data carrier, wherein the command comprises a kill command associating the command with a data payload of the machine-readable data carrier; and executing the command.

46. The method of claim 45 wherein the machine-readable data carrier is a radio-frequency identification device.

* * * * *